Patented Sept. 22, 1931

1,824,144

UNITED STATES PATENT OFFICE

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK

AUTOMATIC SPEED CONTROL OF VEHICLES

Application filed February 10, 1915. Serial No. 7,287.

This invention relates to improvements in devices for the automatic control of the speed of vehicles.

The primary object of this invention is the production of such an arrangement and construction of devices positioned upon a vehicle and along the trackway upon which the vehicle moves for mutual co-action so that the speed of the vehicle will at all times be governed automatically so as to prevent its speed from exceeding a safe speed for the locality where it may be.

Other objects and advantages will appear as the description of the invention progresses, and the novel features of the invention will be particularly pointed out in the appended claims.

Figure 1:
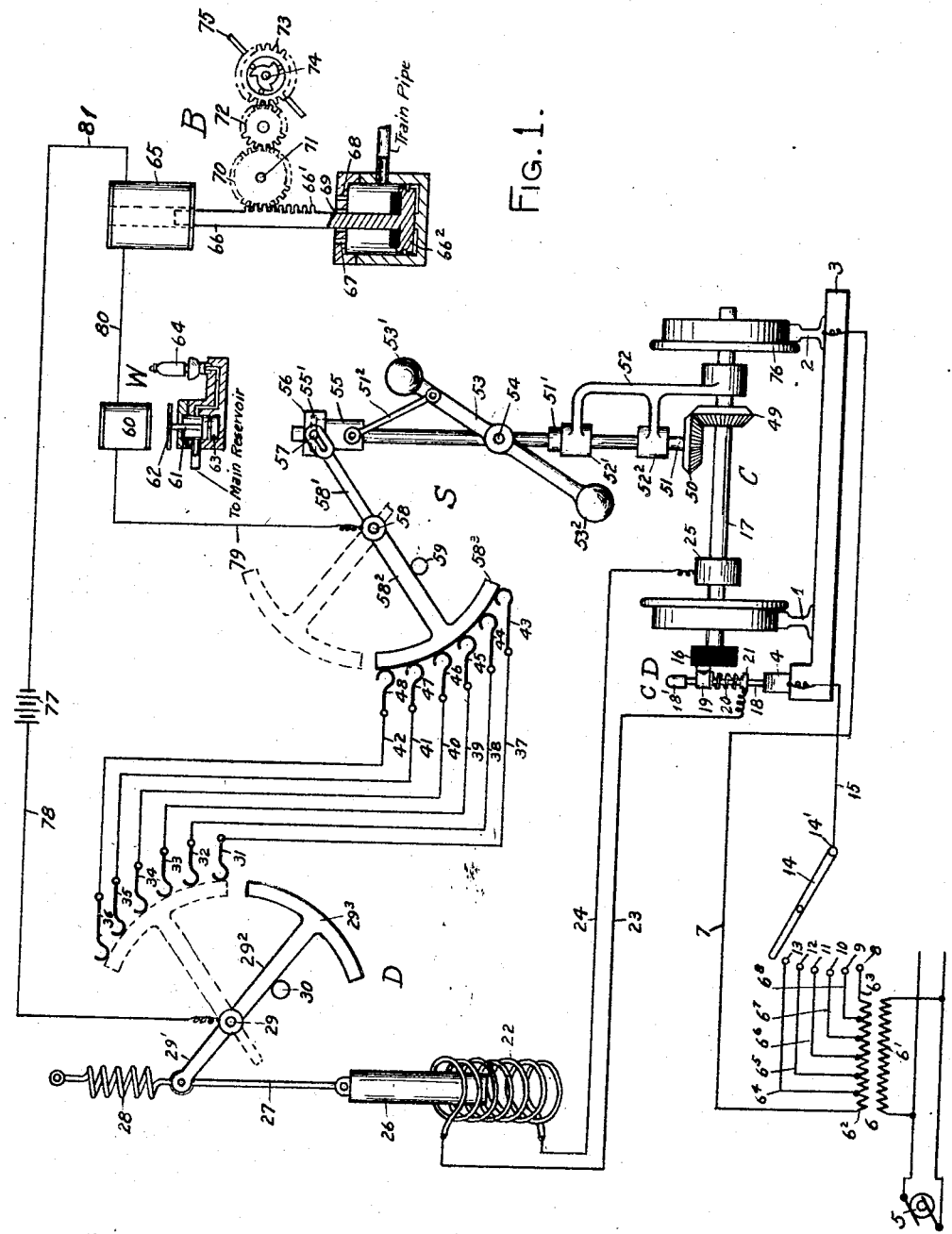
Figure 2:
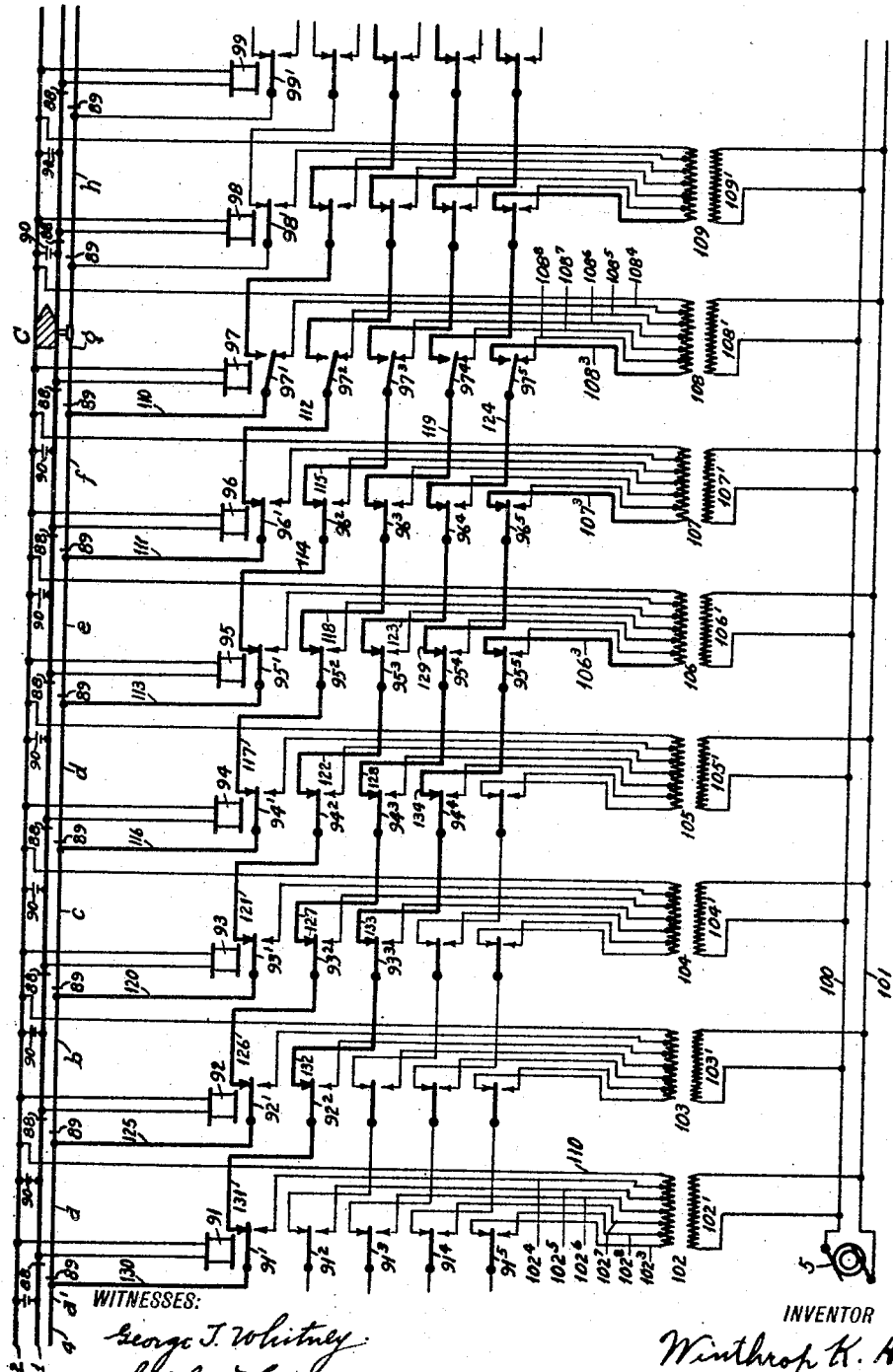

In describing the invention in detail, reference is had to the accompanying drawings, wherein I have illustrated a preferred physical embodiment of my invention, and wherein like characters of reference designate corresponding parts throughout the several views, and in which:

Figure 1 is a schematic illustration of a vehicle with applicant's improvements applied thereto; Fig. 2, is a schematic diagram of a railway track having applied thereto the proper arrangement for suitably controlling a railway vehicle movable thereon so that its speed will be suitably automatically controlled.

The vehicle selected for the purposes of illustration has been illustrated as supported upon the two rails 1 and 2, constituting a trackway. The rails 1 and 2 are supported, as in ordinary practice, by the cross tie 3. The cross tie 3 also supports a third rail 4. 5 designates any suitable source of electro-motive force herein illustrated as an alternating current generator. The generator 5 is connected to the primary winding $6^1$ of a transformer designated generally by 6. The secondary of transformer 6 is designated generally by $6^2$. One extreme terminal of the secondary winding $6^2$ is connected by means of the wire 7 to the track rail 2, and the other extreme terminal of the secondary $6^2$ is connected by means of the wire $6^3$ to the contact terminal 8. Between the extreme terminals of the secondary $6^2$ are connected at points of successively arithmetically increasing points of potential the wires $6^4$, $6^5$, $6^6$, $6^7$ and $6^8$, which are respectively connected to the contact terminals 13, 12, 11, 10 and 9. A switch arm 14 is pivoted at $14^1$ and may by being rotated upon its pivot be brought successively into contact with the contact terminals 13, 12, 11, 10, 9 and 8. The pivot point $14^1$ of the switch arm 14 is connected by means of wire 15 to the third rail 4.

The vehicle illustrated, designated generally by C, has positioned thereon devices typical of these contemplated by applicant's invention for suitably controlling the speed of the vehicle. These devices in the main consist of a contact device CD; a permissive speed indicator D; a speed indicator S; a warning device W; and a brake actuating device B.

The contact device CD is positioned on a side bar 16 which is supported by the axle 17 of the vehicle C. The contact device consists of a vertically movable rod 18 which passes through the projection 19 fastened to the side bar 16, and is spring pressed downwardly by the spring 20, which at one end bears against the projection 19, and at the other end against a collar 21 fastened rigidly to the rod 18. To prevent the rod 18 from being forced down so low as to cause its upper end to move out of the projection 19 the rod has been enlarged at its upper end $18^1$.

The permissive speed indicator D includes a solenoid 22, one end of which is connected by means of wire 23 to the collar 21 upon the rod 18, and the other end of which is connected by means of wire 24 to any suitable collar, as 25, positioned upon axle 17 so as to make good metallic contact therewith. The solenoid 22 has positioned therein a magnetic core 26 connected by a link 27 to a spring 28, which when the solenoid is deenergized holds the core 26 at its upper limit; that is, nearly withdrawn from the solenoid 22 and in the position shown in the drawing. A lever pivoted at 29 has one arm $29^1$ extending on one side of the pivot and pivotally connected to the junction between the link 27 and the spring 28; the other arm 29² is located on the other side of the pivot 29 and bears the arcuate metallic member 29³. The lever having the arms 29¹ and 29² is moved together with link 27 and core 26 by the action of spring 28 to the position shown in the drawing; that is, resting against the pin 30 when the solenoid 22 is not energized. An energization of solenoid 22 will cause a downward movement of core 26, link 27 and arm 29¹, and an upward movement of arm 29² and arcuate metallic member 29³, and will thereby cause the arcuate metallic member 29³ to contact successively with contact springs 31, 32, 33, 34, 35 and 36, which by means of wires 37, 38, 39, 40, 41 and 42 respectively connect the contact springs 31, 32, 33, 34, 35 and 36 with the contact springs 43, 44, 45, 46, 47 and 48.

The axle 17 has rigidly attached thereto the beveled gear wheel 49, which meshes with the beveled gear wheel 50. The beveled gear wheel 50 is attached rigidly to a vertical shaft 51 supported in bearings 52¹ and 52² of the support 52, which is suitably mounted upon the axle 17 so as to be supported thereby and always maintained at a fixed relation thereto. The vertical shaft 51 has a collar 51¹ rigidly attached thereto, and so positioned as to bear upon the top face of the bearing 52¹, so as to maintain the vertical shaft 51 at the proper height, so that beveled gear wheel 50 will properly mesh and be turned by beveled gear wheel 49. A double armed lever 53 is pivoted by means of pivot pin 54 to the vertical shaft 51. This double armed lever 53 has a decided enlargement 53¹ and 53² at either end thereof so that upon a rotation of vertical shaft 51 and the consequent rotation of double armed lever 53 the effect of centrifugal force will be to cause the double armed lever 53 to approach more and more closely a horizontal position. One arm of the double armed lever 53 is connected by means of link 51² to a sleeve 55, which is freely movable longitudinally upon vertical shaft 51. The sleeve 55 has an enlarged shoulder 55¹ at its upper end which bears within a groove in collar 56. The rotative movement of sleeve 55 will not cause a rotative movement of collar 56, but a longitudinal movement of sleeve 55 will cause a corresponding longitudinal movement of collar 56. The pin 57 located in collar 56 bears within a slot in the end of arm 58¹ of a two armed lever pivoted at 58, which has another arm 58² on the opposite side of the pivot 58 from the arm 58¹. The arm 58² bears the arcuate metallic member 58³, which bears against all of the contact springs 43 to 48 inclusive when in the position as shown in the drawing, and also bears against the stop 59 to limit a further rotative movement downward upon its pivot 58. The arcuate metallic member 58³ contacts with the contact springs 43 to 48 inclusive when the double armed lever 53 is in the position as shown in the drawing, but upon a rotation of vertical shaft 51 the movement toward the horizontal of double armed lever 53 causes a downward movement of link 51², sleeve 55, collar 56 and arm 58¹, thereby causing an upward movement of arm 58², which causes the arcuate metallic member 58³ to successively disengage the contact springs 43 to 48 inclusive.

The warning device W may be of any of the well known forms, but has been herein illustrated as an electromagnet 60 having an armature 62 to which a rod 61 is connected that bears at its lower end a piston valve 63, which when in the position shown allows air to flow from any suitable source of air supply, such as the main reservoir of an air brake system, to a whistle, or similar warning device, 64. The energization of magnet 60 will cause the piston valve 63 to rise and cut off communication between the source of air supply and the whistle 64.

The brake actuating device B has been herein illustrated as consisting of a solenoid 65 having a core 66, the intermediate portion of which is formed into a rack 66¹, and which at its lower end bears the piston valve 66². The solenoid 65 when deenergized allows the core 66 to fall and so cause its piston valve 66² to assume the lower position, as shown, thereby allowing air from a train pipe, for instance, to exhaust to atmosphere, through the vents 67 and 68, and also around the core, as at 69. The rack teeth 66¹ engage with a pinion 70, fastened rigidly to a shaft 71, and the teeth of the gear wheel 70 engage with the teeth of a gear wheel 72, which engage with the teeth of a gear wheel 73, which by means of any suitable or any well known clutch, as by means of the ordinary and well known ball clutch, will be connected or dis-connected, according to the direction of rotation of wheel 73, from the shaft 74, which has rigidly attached thereto and positioned at right angles thereto the vane 75. The ball clutch between gear wheel 73 and shaft 74 is so formed that a rigid connection will be formed between the gear wheel 73 and the shaft 74 when the rack 66 is moving downwardly, but such connection will not be formed when the rack 66 is moving upwardly, so that by virtue of the vane 75, when rack 66 is at its upper limit so that piston valve 66² closes connection between the train pipe and vent 67 and 68, and desired interval of time may be caused to elapse after a deenergization of solenoid 65 before the piston valve 66² opens connection between the train pipe and the vent 67 and 68. On the other hand when rack 66 is is at the lower limit of its movement it may be picked up instantly by an energization of electromagnet 65.

When all parts are as shown in the drawing there will be no flow of current through electromagnets 60 and 65 and solenoid 22.

If switch arm 14 is moved into contact with contact terminal 13 then a flow of current will take place in the following circuit: secondary $6^2$, wire 7, track rail 2, wheel 76, axle 17, collar 25, wire 24, solenoid 22, wire 23, collar 21, rod 18, third rail 4, wire 15, pivot $14^1$, switch arm 14, contact terminal 13 and wire $6^1$ to the terminal of the secondary $6^2$. The difference of potential between the terminals of the portion of secondary $6^2$ included in the above circuit will be assumed to be ten volts. Such difference of potential will cause such a flow of current through solenoid 22 as will cause it to move core 26 downwardly a sufficient distance to cause link 27 through arm $29^1$ and arm $29^2$ to move arcuate metallic member $29^3$ into contact with contact spring 31. Under such conditions a circuit will be formed as follows: Positive terminal of battery 77, wire 78, arm $29^2$, arcuate metallic member $29^3$, contact spring 31, wire 37, contact spring 43, arcuate metallic member $58^3$, arm $58^2$, wire 79, electromagnet 60, wire 80, solenoid 65 and wire 81 to the other terminal of the battery 77. Current flowing in the above traced path will energize electromagnet 60 and so shut off connection between the main reservoir and the whistle 64, and so cause the whistle to cease sounding. The current will also sufficiently energize solenoid 65 to cause core 66 to be drawn to its upper limit, thereby closing the path from train pipe to atmosphere.

If the vehicle should now move and attain a certain predetermined low speed as for instance five miles per hour, then the arcuate metallic member $58^3$ would be moved upwardly so as to break contact with contact spring 43, which would break the circuit through electromagnet 60 and solenoid 65 hereinbefore traced. The breaking of such circuit would immediately cause the warning whistle 64 to sound and would also allow core 66 to move downwardly, but by virtue of the time interval mechanism connected to core 66 it would not descend so rapidly that it would vent the train pipe to atmosphere before the driver of the vehicle had an opportunity to sufficiently reduce the speed of the vehicle so that arcuate metallic member $58^3$ would move back into contact with contact spring 43. As soon as contact was again made between arcuate metallic member $58^3$ and contact spring 43 the circuit hereinbefore traced through which current flowed to energize electromagnet 60 and solenoid 65, would be again formed and the warning whistle 64 would be silenced and the connection between the train pipe and atmosphere would not be formed. If switch arm 14 were placed in contact with contact terminal 12 then such a section of the secondary $6^2$ of the transformer 6 would be placed in the circuit with solenoid 22 as would cause a current to flow by virtue of a difference of potential greater, as for example, twice as great as when the switch arm was in contact with contact terminal 13. Under such conditions core 26 would be drawn down so far as to cause arcuate metallic member $29^3$ to contact not only with contact spring 31, but also with contact spring 32, so that the speed of the vehicle could then be increased to the point where arcuate metallic member $58^3$ just failed to break contact with contact spring 44. If switch arm 14 were placed in contact with contact terminal 11 then the available difference of potential would be three times what it was when the switch arm was in contact with contact terminal 13, and arcuate metallic member $29^3$ would move into contact with contact spring 33 so that the speed of the vehicle could then be increased to a point where arcuate metallic member $58^3$ just failed to break contact with contact spring 45. If switch arm 14 were placed in contact with contact terminal 10 then arcuate metallic member $29^3$ would move into contact with contact spring 34 and the speed of the vehicle could be increased to the point where arcuate metallic member $58^3$ just failed to break contact with contact spring 46. If switch arm 14 were placed in contact with contact terminal 9, then arcuate metallic member $29^3$ would be moved into contact with contact spring 35 and the speed of the vehicle could be increased to a point where arcuate metallic member $58^3$ just failed to break contact with contact spring 47. If switch arm 14 were moved into contact with contact terminal 8, then arcuate metallic member $29^3$ would be moved to the limit of its motion, as indicated by dotted lines, and would make contact with contact spring 36 and with all of the other contact springs, and the speed of the vehicle could be increased to a point such that arcuate metallic member $58^3$ just failed to break contact with contact spring 48.

With arcuate metallic member $29^3$ making contact with all of contact springs 31 to 36 inclusive, the speed of the vehicle can reach its highest possible value, but even with arcuate metallic member $29^3$ in the position as described the speed of the vehicle is not unlimited, for if it increases to such a point that arcuate metallic member $58^3$ breaks contact with contact spring 48, then, in the manner hereinbefore described electromagnet 60 will be deenergized, sounding the warning whistle and solenoid 65 will be deenergized, causing a venting of the train pipe, but just as hereinbefore described, if the circuit is actually broken under such conditions by the movement of arcuate metallic member $58^3$ from in contact with contact spring 48 when moving upwardly, then a proper interval of time will elapse between the sounding of the whistle 64 and the actual venting of the train pipe sufficient to allow the driver of the vehicle to take control of the vehicle and reduce its speed so that arcuate metallic member $58^3$ would again contact with contact spring 48 and again close the circuit through the electromagnet 60 and the solenoid 65, so as to stop the warning whistle and close the vent from the train pipe to atmosphere.

Not only will the circuit through electromagnet 60 and solenoid 65 be broken by an excessive speed, but if the speed is not excessive, but is just of sufficient value to maintain the arcuate metallic member $58^3$ to the dotted line position shown in Fig. 1, so that it is in contact with contact spring 48, the circuit may also be broken by moving switch arm 14 from in contact with contact terminal 8 to in contact with contact terminal 9, which will cause the arcuate metallic member $29^3$ to drop back from in contact with contact spring 36, which will break the circuit through electromagnet 60 and solenoid 65 and result in giving the warning and venting the train pipe. If the switch arm 14 is moved into contact with contact terminal 9, then the driver must reduce the speed of the train sufficiently to allow arcuate metallic member $58^3$ to drop back sufficiently to make contact with contact spring 47. Then if the switch arm 14 is moved into contact with contact terminal 10 the arcuate metallic member $29^3$ will drop back out of contact with contact spring 35 and then the speed of the train must be reduced sufficiently to cause arcuate metallic member $58^3$ to move back sufficiently to make contact with contact spring 46, and so on until switch arm 14 is moved into contact with contact terminal 13, at which time the arcuate metallic member $58^3$, as hereinbefore explained, must make contact with contact spring 43, or the warning will be sounded and the train pipe vented.

From the above description it will be seen that the control of the train is governed by two factors:—One, the permissive speed established or determined by the value of the electro-motive force causing a flow of current through solenoid 22; the other, the actual speed of the train. The value of the actual speed factor must never be excessive for the value of the permissive speed factor established by the electro-motive force existing. If it does an automatic application of the brakes is effected if the driver of the vehicle does not take immediate notice of the preliminary warning and lower the value of the actual speed factor so that it will not be excessive compared with the permissive speed factor existing at that time.

To make use of the arrangement shown in Fig. 1, as positioned on the movable vehicle in an automatic system upon an actual railway, it is merely necessary to re-produce automatically the varying differences of potential which were created manually by the movement of switch arm 14 described in connection with Fig. 1. This applicant has done, and by reference to Fig. 2 will be seen a preferred arrangement.

In Fig. 2, 1 designates one rail of a railway track, of which 2 designates the other rail and 4 designates the third rail. The track is divided by insulating joints 88 into electrically isolated sections, and the third rail 4 is divided by the insulating joints 89 in the same manner into electrically isolated sections. Each of the electrically isolated sections of the track rails 1 and 2 have connected across them at one end a source of electro-motive force, as 90, and at the other end a translating device in the form of a relay, as 91, 92, 93, 94, 95, 96, 97, 98 and 99. Each of the relays 91 to 99 inclusive control armatures which are in the upper position when no train is upon the track section to which the relay is connected, but which are in the lower position when a train is upon the track section to which the relay is connected.

Any suitable source of electro-motive force, herein shown as alternating current generator, and designated 5, may be employed to which are connected the line wires 100 and 101 which extend the length of the trackway. At suitable points in the primaries $102^1$, $103^1$, $104^1$, $105^1$, $106^1$, $107^1$, $108^1$ and $109^1$ of the transformers 102, 103, 104, 105, 106, 107, 108 and 109 respectively are connected across the line wires 100 and 101. The secondaries of the transformers 102 to 109 inclusive are each formed in the same manner as the secondary $6^2$ shown in Fig. 1; that is, one terminal of the secondary is connected directly to track rail 2 and the other extreme terminal is connected to the front point of a track relay. The intermediate taps on the transformer are connected to the back points of a track relay. This will be evident by referring to the secondary of transformer 102 where it will be seen that one extreme terminal of the secondary is connected by means of wire 110 to the track rail 2; the other extreme terminal is connected by means of wire $102^3$, to a front point of relay 91, which co-acts with armature $91^5$. The first and lowest voltage step is between wires 110 and $102^4$ and wire $102^4$ is connected to a back point co-acting with armature $91^1$. The next voltage step is between wire 110 and wire $102^5$ and wire $102^5$ connects with a back point which co-acts with armature $91^2$. The next voltage step is between wire 110 and wire $102^6$ and wire $102^6$ connects with a back point which coacts with armature $91^3$. The next voltage step is between wires 110 and $102^7$ and wire $102^7$ connects to a back point co-acting with armature $91^4$. The next voltage step is between wires 110 and $102^8$ and the wire $102^8$ is connected to a back point co-acting with armature $91^5$.

Each of the transformers 102 to 109 inclusive have secondaries formed as shown in the figure in exactly the same manner, and are connected in exactly the same manner, to the respective relays 91 to 99 inclusive, although, of course, it is to be understood that the particular arrangement shown is merely illustrative, and that in practice the connections and arrangements would be such as would be dictated by good signalling practice on account of the exigencies of the particular section of trackway to which the system would be applied.

A car or train is shown upon the trackway and designated C. With a train on the trackway at such point different differences of potential would be created between the track rail 2 and the successive sections of third rail 4 back of the train C, until a point was reached behind which all sections of the track rail 4 would be at equal differences of potential with the track rail 2.

The train C being on the section indicated would cause a deenergization of relay 97, thereby causing all of its armatures $97^1$, $97^2$, $97^3$, $97^4$ and $97^5$ to be in the lower position, as shown. Under such conditions the section $f$ of third rail 4 connects by means of wire 110 with armature $97^1$, and so with tap $108^4$, which is the lowest voltage tap, so that the lowest difference of potential would exist between the track rail 2 and the section $f$, consequently, any train upon the trackway opposite the section $f$, if equipped with the arrangement shown in Fig. 1, would necessarily have to be moving at a speed, say, not greater than five miles an hour, or the warning whistle would be sounded and the train pipe vented. The third rail section $e$ would connect by means of wire 111 with armature $96^1$ in the upper position as shown, contacting with wire 112 which at its other end would connect with armature $97^2$ in the lower position as shown, and would connect section $e$ with the second tap on the transformer $108^5$, and consequently a train upon the trackway opposite section $e$ could not be moving at a speed greater than, say, ten miles per hour. Section $d$ would connect by wire 113 with relay armature $95^1$, which would be in the upper position as shown, contacting with wire 114, which at its other end connects with armature $96^2$, which would be in the upper position, as shown, connecting with wire 115, which at its other end connects with armature $97^3$, which would be in the lower position, as shown, thus connecting section $d$ with tap $108^6$, so that a train upon the trackway opposite section $d$ could not be moving at a speed greater than, say, twenty miles per hour. Section $c$ would be connected by means of wire 116 to armature $94^1$, which would be in the upper position, as shown, connecting with wire 117, which connects at its other end with armature $95^2$, which would be in the upper position as shown, connecting with wire 118, which at its other end connects with armature $96^3$, which would be in the upper position, as shown, connecting with wire 119, which connects with armature $97^4$, which would be in the lower position, as shown, thereby connecting with tap $108^7$; consequently, any train upon the trackway opposite the section $c$ could not be moving at a speed greater than, say, thirty miles per hour. Section $b$ would be connected by wire 120 with armature $93^1$, which would be in the upper position, as shown, connecting with wire 121, which at its other end connects to armature $94^2$, which would be in the upper position, as shown, connecting with wire 122, which would connect with armature $95^3$, which would be in the upper position, as shown, connecting with wire 123, which at its other end connects with armature $96^4$, which would be in the upper position, as shown, connecting with wire 124, which at its other end connects with armature $97^5$ in the lower position, as shown, thus with tap $108^8$, so that any train upon the trackway opposite the section $b$ could not be moving at a speed greater than, say, forty miles per hour. Section $a$ would be connected by wire 125 with armature $92^1$, which would be in the upper position, as shown, connecting with wire 126, which at its other end connects with armature $93^2$, which would be in the upper position, as shown, connecting with wire 127, which at its other end would connect with armature $94^3$, which would be in the upper position, as shown, connecting with wire 128, which at its other end connects with armature $95^4$, which would be in the upper position, as shown, connecting with wire 129, which at its other end would be connected with armature $96^5$, which would be in the upper position, as shown, connecting with tap $107^3$, so that section $a$ would thereby be connected with tap $107^3$ and the full potential of the secondary of transformer 107 would exist between the section $a$ and track rail 2, so that a train upon the trackway opposite that section could move at a speed limited only by the position of the arcuate metallic member $58^3$; that is, it could move at the highest permissible speed allowed upon the railway. All of the sections of the third rail 4 located back of section $a$ would with train C located as shown in Fig. 2 be connected with the extreme terminal of the secondary of a transformer; that is, section $a^1$, for instance, would be connected by means of wire 130 to armature $91^1$, which would be in the upper position as shown, connecting with wire 131, which at its other end would be connected with armature $92^2$, which would be in the upper position as shown, connecting with wire 132, which at its other end would be connected with armature $93^3$, which would be in the upper position as shown, connecting with wire 133, which at its other end would be connected with armature $94^4$, which would be in the upper position as shown, connecting with wire 134, which at its other end would be connected to armature $95^5$, which would be in the upper position as shown, connecting with wire $106^3$, so that the full potential of the secondary of transformer 106 would exist between the third rail section $a^1$ and the track rail 2.

The insulating joints 89 are placed just far enough back of insulating joints 88, so that the contacting device as 18 of a train will contact with another section of third rail before the difference of potential between the section with which it has been in contact and a rail of the track has been reduced to the lowest value so that excessive abrupt changes in differences of potential between a third rail and the track rail will not be encountered by the contacting device on the vehicle.

From the above description it will be seen that a train equipped as shown in Fig. 1, moving upon a section of trackway equipped as shown in Fig. 2, would be able to move at the highest permissible speed just so long as it was on a section of trackway opposite a third rail section between which and one of the track rails the highest difference of potential existed, but that as a train approached a preceding vehicle upon the trackway the driver of the vehicle would be obliged to make successive reductions in speed until he reached the section of trackway just in the rear of the preceding train, at which place the speed of the vehicle would be not above such a speed as would enable him to bring the vehicle to a stop in a very short distance.

The speed at which a vehicle would be allowed to move in a system such as has been hereinbefore described would be a speed not above the speed at which a train could be automatically stopped or brought down to a non-dangerous speed before reaching a preceding train; that is, the vehicle would be allowed to travel at that rate of speed consistent with the greatest capacity of the road and proper safety. Furthermore, no automatic application of brakes would occur just so long as the driver of the vehicle controlled the vehicle in accordance with the indications given.

Although applicant has herein described his invention as applied to a straight section of trackway uniformly connected and arranged throughout, it is not to be understood that in practice applicant is limited to that precise arrangement, because, as is well known to those skilled in the art of railway signalling, the speed at which vehicles may move upon different sections of a given trackway is governed not only by the presence of movable hazards ahead, such as preceding vehicles, but also by the existence of fixed hazards such as curves, grades, station stops and switches, so that in practice the system actually used would only in rare cases exhibit the uniformity illustrated by applicant in the drawings, but would be arranged so that proper speeds of the vehicles could be maintained, having due regard not only to preceding vehicles, but to the fixed hazards along the right of way. Such changes, however, are well within the skill of the signal engineer, and could be effected without departing from the principle or spirit of the invention.

Also, while the particular embodiment of the invention shown and described establishes communication between the trackway and the moving vehicle by means of contact rail sections along the track cooperating with a contact shoe carried by the vehicle, the invention is not limited to this particular means of transmitting impulses to the vehicle, and I desire to have it understood that other forms of impulse transmitting means capable of performing the functions and producing the action desired, may be used without departing from my invention.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a system of automatic train control for protecting railway traffic, in combination: a railroad track; impulse transmitting devices distributed along the track; means responsive to the presence of a train on said track for producing progressively varying electrical conditions of several of said impulse transmitting devices in the rear of said train; and means on a following vehicle responsive to said varying electrical conditions of said impulse transmitting devices for automatically enforcing corresponding limitations on the speed of said following vehicle.

2. In a system for protecting railway traffic, in combination: a track divided into units a plurality of which constitute braking distance; train controlling means associated with each unit, means whereby a train produces different electrical conditions in said train controlling means in the rear of that train; said electrical condition of each unit being regulated by said means in accordance with the distance between that unit and the rear of said train; and means on a following train responsive to the electrical conditions of said train controlling means at substantially all points in the travel of the train over each unit for regulating the speed of said following train in accordance with its distance from the preceding train.

3. In a system of automatic train control for protecting railway traffic, in combination: a railroad track divided into sections provided with normally closed track circuits, a plurality of which constitute braking distance for the vehicles traveling on the track; impulse transmitting devices associated with said track sections and impressed with progressively varying electrical conditions according to the number of said plurality of track sections in advance thereof that are not occupied; and means on a following vehicle for automatically enforcing limitations upon its speed in accordance with the variations in the electrical conditions of said impulse transmitting devices.

4. In a system of automatic train control for protecting railway traffic, in combination: a railroad track; impulse devices disposed along said track; means responsive to the presence of a train on said track for producing progressively varying controlling conditions of said impulse devices in the rear thereof in accordance with the distance between these respective devices and said train; and automatic means on a following vehicle controlled electrically by said devices for imposing a different fixed speed limit for each different controlling condition of said impulse devices.

5. In a system for protecting railway traffic, in combination: a track; a vehicle adapted to travel on said track; means responsive to alternating currents of different characteristics for governing the speed of said vehicle; and means for supplying such alternating currents to said means at substantially all points along the track, said last mentioned means varying the electrical characteristics of said currents progressively in accordance with the extent of unoccupied track in advance of the vehicle.

6. In a system of automatic train control for protecting railway traffic, in combination: a railway vehicle and a track therefor; impulse means adapted to communicate different controlling impulses to the vehicle at intervals along the track; means on the vehicle responding to the actual speed thereof; means on the vehicle adapted to be influenced to a variable degree by said impulse means for establishing correspondingly varying permissive speeds for the vehicle; a warning signal governed by both of said means and operated when the actual speed of the vehicle exceeds its permissive speed; a slow-acting device adapted to assume its ultimate condition after an interval of delay following its initial operation, said slow-acting device being also governed by both of said first mentioned means; and a brake-setting appliance actuated by said slow-acting means after it has assumed its ultimate condition.

7. In a system for protecting railway traffic, in combination: a track divided into track circuit sections; a contact rail associated with each track section and adapted to transmit controlling impulses to a vehicle passing through the corresponding track section; and means governed by said track circuit sections for establishing a difference of potential between each contact rail and a track rail which varies in intensity according to the number of unoccupied track sections in a portion of the track in advance of the corresponding track section.

8. In a system for protecting railway traffic, in combination: a track; a vehicle adapted to travel upon said track; means on the vehicle for establishing a permissive speed therefor; traffic controlling devices located along the track and adapted to govern said means on the vehicle; and means for varying the electrical conditions of said controlling devices to thereby establish different permissive speeds for said vehicle.

9. In a system for protecting railway traffic, in combination: a track divided into track circuit sections; a vehicle adapted to travel over said track; a contact rail associated with each track section and extending the length thereof; means controlled by said track circuit sections for establishing a difference of potential between each contact rail and a track rail varying in electrical characteristics according to the number of several track sections in a portion of said track in advance of the corresponding track section which are not occupied; traffic protecting means on the vehicle responsive to currents of different characteristics; and means for establishing electrical communication between said contact rails and said last mentioned means.

10. In a system for protecting railway traffic, in combination: a track divided into track circuit sections; a vehicle adapted to travel on said track; a contact rail associated with each track section; means controlled by said track circuit sections for establishing a difference of potential between each contact rail and a track rail which varies in intensity according to the number of unoccupied track sections in a portion of said track in advance of the track section corresponding to said contact rail; a shoe carried by the vehicle and adapted to cooperate with said contact rails; a partial circuit on the vehicle terminating at said shoe and at the wheels of said vehicle; means controlled by said partial circuit for establishing the permissive speed of the vehicle; means responding to the actual speed of the vehicle; and means for governing the movement of said vehicle governed by the co-action of said two last mentioned means and operated when the actual speed of the vehicle exceeds its permissive speed.

11. In combination, a railway vehicle, a vehicle controlling means thereon, means for controlling said vehicle controlling means comprising a speed governor controlled part and a speed limit device, said speed limit device including an electrically-operated translating device having a movable part whose movement is proportional to the strength of current passing therethrough, and electrical means along the trackway co-operating with said translating device to cause currents of different current strengths to pass therethrough.

12. In combination, a railway vehicle, vehicle controlling means thereon, means for controlling said vehicle controlling means comprising a speed-controlled part and a speed limit device operable in accordance with the strength of current passing therethrough, and electrical means along the trackway co-operating with said speed limit device to cause currents of different current strengths to pass through said speed limit device.

13. In a system for protecting traffic on railroads having a track divided into units, the combination with a stationary impulse transmitting device associated with each unit and adapted to be controlled electrically to assume any one of a plurality of different controlling conditions, of means associated with each unit for detecting the presence of a train thereon, trackway apparatus and circuits controlled by each of said means for causing a plurality of said impulse transmitting devices in the rear thereof to assume controlling conditions which vary in accordance with the distance between each particular device and the unit occupied by a train, and automatic apparatus on a following vehicle responding to the varying controlling conditions of said impulse transmitting devices for automatically enforcing corresponding limitations on the speed of the following vehicle, whereby the speed of the following vehicle is regulated in accordance with the distance between it and the forward train.

14. In a system for protecting traffic on railroads having tracks divided into track circuit sections, the combination with a stationary impulse transmitting device associated with each track section and adapted to assume any one of a plurality of controlling conditions, each impulse transmitting device being controlled electrically by the track circuits of a plurality of track sections in advance thereof and being caused to assume a particular controlling condition corresponding to the number of these track sections in advance which are not occupied, and automatic apparatus on a following vehicle for restricting the speed thereof to a different fixed speed limit for each controlling condition of said impulse transmitting devices, whereby a gradually decreasing limitation on the speed of the following vehicle is automatically enforced as it approaches a train ahead.

15. In a system for protecting traffic on railroad tracks, the combination with stationary impulse transmitting devices distributed along the track, each adapted to assume any one of more than three different controlling conditions, of means associated with each of several predetermined portions of the track and responsive to the presence of a train on the corresponding portion for governing the controlling condition of a number of impulse transmitting devices in the rear thereof in accordance with the distance between each particular device and said occupied portion of track, and means on a following vehicle responsive jointly to its speed and the varying controlling conditions of said impulse transmitting devices for automatically controlling the movement of the following vehicle.

16. In a system for protecting railway traffic; a track divided into track circuit sections; a contact rail extending along the track and divided into sections corresponding to each track section; and means governed by said track circuit sections for establishing a difference of potential between each contact rail section and a track rail which varies in intensity according to the number of unoccupied blocks in a portion of the track in advance of the corresponding track section.

17. In a system for protecting traffic on railroad tracks, the combination with several impulse transmitting means distributed along the track and adapted to assume progressively varying distinctive controlling conditions throughout a region of limited extent, of trackway apparatus and circuits responsive to the presence of a train on the track for governing the controlling condition of said means, and automatic apparatus on a following vehicle responding selectively to the distinctive controlling conditions of said means at substantially all points in the travel of the vehicle and acting to automatically enforce a limitation on the speed of said vehicle corresponding to the particular controlling condition at the point where the vehicle is located.

18. In a system for protecting traffic on railroad tracks, the combination with automatic apparatus on each vehicle traveling over the track responsive to electrical energy of different characteristics and acting automatically to restrict the speed of the vehicle to correspond to the particular characteristic of the electrical energy supplied thereto, of means partly on the vehicle and partly distributed along the track which is rendered effective by the presence of a train on said track to transmit electrical energy to said apparatus on the vehicle at substantially all points in its travel of a particular characteristic dependent on the distance between said train and the respective point.

19. In a system for automatically protecting traffic on railroad tracks, the combination with trackway apparatus comprising several stationary impulse transmitting devices distributed along the track throughout a region of limited extent and having their respective controlling conditions dependent on their location in said region, of automatic mechanism on a vehicle responsive at substantially all points in its travel to the controlling condition of each impulse transmitting device and acting to retard the vehicle at each device if its speed exceeds a predetermined speed corresponding to the controlling condition of that particular device.

20. In a system for automatically protecting traffic on railroad tracks, the combination with permanently located impulse transmitting means extending along the track and divided into units, of means responsive to the presence of a train on the track for governing the controlling condition of each of several of said units in the rear of said train, the controlling conditions of such several units being distinctive and being individually determined in accordance with the distance between the train and that particular unit, and automatic mechanism on a following vehicle responding to the distinctive controlling conditions of said units at substantially all points in the travel of the vehicle for automatically enforcing correspondingly varying limitations on the speed of the vehicle.

21. In a system for automatically protecting traffic on railroad tracks, the combination with trackway apparatus comprising several stationary influence elements distributed along the track throughout a region of limited extent, of automatic mechanism on a vehicle responding to the influence of said elements and acting to retard the vehicle in case it travels by an element at a greater speed than is prescribed by said element as a result of its controlling effect on said mechanism, said elements being capable of having distinctive controlling effects on said mechanism dependent on their location in said region.

22. In a system for automatically protecting traffic on railroad tracks, the combination with several stationary impulse transmitting devices distributed along the track and adapted to have distinctive controlling conditions when a train is on the track adjacent thereto, of automatic apparatus on a vehicle cooperating with the several impulse devices and acting to cause a restriction of the speed of the vehicle at each of these devices to a certain extent dependent on the respective controlling condition of said devices.

23. In a system for automatically protecting traffic on railroad tracks, the combination with automatic mechanism on a vehicle for controlling the movement thereof and including an element capable of being regulated to determine any one of three or more fixed speed limits at which the vehicle may travel, of impulse transmitting means for regulating said element, said means including several stationary devices distributed along the track and having distinctive controlling conditions which vary progressively throughout a region behind a train on the track.

24. In a system for automatically protecting traffic on railroad tracks, the combination with automatic mechanism on a vehicle capable of being controlled by varying controlling influences to automatically enforce any one of three or more predetermined fixed speed limits for the vehicle, of impulse transmitting means comprising elements on the vehicle cooperating with stationary elements along the track for transmitting variable controlling influences to said mechanism, and trackway means and circuits responsive to the presence of a train on the track for controlling electrically the several trackway elements of said impulse transmitting means throughout a region of limited extent behind such train, said trackway elements under the control of said trackway means and circuits acting through the vehicle carried elements of said impulse transmitting means to transmit to the mechanism on the vehicle at substantially all points in its travel controlling influences which vary progressively as the vehicle travels through said region.

25. In a system for automatically protecting traffic on railroad tracks, the combination with several stationary impulse transmitting devices distributed along the track throughout a region of limited extent and adapted to be governed electrically to assume distinctive controlling conditions which progressively vary throughout said region dependent on the location of the respective devices in said region, said devices being simultaneously influenced by the presence of a temporary hazard adjacent to said region, of automatic means on a vehicle responding to the influence of said impulse transmitting devices at substantially all points in its travel for automatically enforcing correspondingly varying limitations on the speed of said vehicle.

26. In a system for automatically protecting traffic on railroad tracks, the combination with a plurality of stationary impulse transmitting devices distributed along the track and adapted to have progressively varying controlling characteristics, of automatic mechanism on a vehicle responsive to the influence of said impulse transmitting devices at substantially all points in the travel of the vehicle and acting under such influence to prevent the vehicle at each device exceeding a predetermined speed prescribed by that particular device, and trackway apparatus responding to the presence of a train on the track for causing the impulse transmitting devices throughout a region of limited extent behind such train to assume controlling characteristics which have a progressively varying influence on the mechanism on a following vehicle as it travels through this region, whereby a gradually decreasing restriction on the speed of the following vehicle is established as said following vehicle approaches the train ahead.

27. In a system for automatically protecting traffic on railroad tracks, the combination with impulse transmitting means for communicating controlling impulses of varying influences from the track to a vehicle traveling on the track, said impulse transmitting means comprising elements on the vehicle cooperating with stationary elements distributed along the track, of means controlled by the presence of a temporary hazard along the track for supplying to the trackway elements of said impulse transmitting means electrical energy which varies progressively according to the location of the particular trackway element relative to the hazard, automatic controlling mechanism on the vehicle comprising a speed responsive device governed by the actual speed of the vehicle and a permissive speed device susceptible to said controlling impulses, and means governed jointly by said speed responsive device and said permissive speed device for retarding the movement of the vehicle whenever its actual speed exceeds the prescribed permissive speed.

28. In a system for automatically protecting traffic on railroad tracks, the combination with automatic mechanism for controlling the movement of a vehicle comprising a speed responsive device having its controlling condition governed by the actual speed of the vehicle, of a permissive speed device capable of having its controlling condition regulated by the varying intensity of electrical energy supplied thereto, and means governed jointly by said speed responsive device and said permissive speed device for retarding the movement of the vehicle whenever its actual speed exceeds the prescribed permissive speed.

29. In a system for automatically protecting traffic on railroad tracks, the combination with automatic mechanism on a vehicle including a permissive speed device adapted to be influenced by the varying intensity of electrical energy supplied thereto and acting to establish different permissive speeds for the vehicle, of impulse transmitting means including elements distributed along the track and adapted to cooperate with an element on the vehicle for controlling the intensity of the electrical energy supplied to the permissive speed device in accordance with the presence and location of a temporary hazard along the track.

30. In a system for automatically protecting traffic on railroad tracks, the combination with a permissive speed device on a vehicle adapted to establish three or more different permissive speeds for the vehicle by assuming different conditions, of means for automatically retarding the movement of the vehicle when such established permissive speed is exceeded, and trackway apparatus including stationary impulse elements located at intervals along the track and adapted to act under the influence of the presence of a train on the track to cause said permissive speed device to assume its different conditions at substantially all points in the travel of the vehicle in accordance with the relative location of the vehicle and the train ahead.

31. In a system for automatically protecting traffic on railroad tracks, the combination with impulse transmitting means including stationary elements distributed along the track and adapted to change from a normal controlling condition to any one of several other controlling conditions, of means responsive to the presence of a train on the track for causing said elements throughout a region of influence of limited extent in the rear of said train to change from the normal controlling condition and to assume progressively varying controlling conditions in accordance with the particular location of said respective elements in said region of influence, and means on a following train responding to the controlling influences of said elements at substantially all points in the travel of said train for automatically limiting the speed of said following train to a predetermined speed at each element corresponding to the existing controlling condition of that element.

32. In a system for protecting traffic on railroad tracks, the combination with automatic apparatus on a vehicle responding to the actual speed of the vehicle, of means partly on the vehicle and partly along the track for establishing a permissive speed for the vehicle in accordance with the extent of unoccupied track in advance thereof, a warning signal governed jointly by said apparatus and said means and operated when the actual speed of the vehicle exceeds its prescribed permissive speed, and brake controlling means on the vehicle also governed jointly by said apparatus and said means and operated after an interval of delay following the operation of said warning signal.

33. In a system for automatically protecting traffic on railroad tracks, the combination with a movable member on a vehicle having its position determined by the controlling condition of devices distributed along the track, of a second movable member having its position determined by the actual speed of the vehicle, a warning signal, brake controlling mechanism for the vehicle acting to apply the brakes of the vehicle after an interval of delay following its initial operation, and means controlled jointly by said movable members for operating the warning signal and said brake controlling mechanism simultaneously.

34. In a system for automatically protecting traffic on railroad tracks, the combination with a vehicle, of automatic brake control apparatus on the vehicle acting to apply the brakes after an interval of delay following its initial operation, a warning signal on the vehicle arranged to give an arrestive indication to the operator of the vehicle, and means on the vehicle cooperating with means along the track for causing simultaneous operation of said warning signal and said brake control apparatus whenever the vehicle exceeds certain prescribed limiting speeds at control points along the track.

35. In a system for automatically protecting traffic on railroad tracks, the combination with trackway apparatus comprising a plurality of influence elements distributed along the track, of automatic mechanism on the vehicle responding to the influence of said elements for restricting the speed of the vehicle at each element to accord with the permissive speed prescribed by that element as a result of its controlling effect on said mechanism, said mechanism having a tendency to impose the lowest speed restriction, said elements acting to exert influence in opposition to said tendency and being capable of having distinctive controlling effects on said mechanism.

36. In a system for automatically protecting traffic on railroad tracks, the combination with automatic mechanism on a vehicle for imposing variable restrictions on the speed thereof, said mechanism having a tendency to impose the lowest speed restriction, of a normally closed track circuit, and means controlled by said track circuit for exerting an influence on said mechanism in opposition to said tendency to a variable degree at substantially all points in the travel of the vehicle and causing said mechanism to impose different fixed speed restrictions varying step by step substantially in accordance with the location of the vehicle relatively to said track circuit.

37. In a system for automatically protecting traffic on railroad tracks, the combination with a changeable element on a vehicle having a tendency to assume an extreme condition, of automatic means on the vehicle controlled by said element for imposing varying restrictions on the speed of the vehicle, the restricted speeds for the vehicle established by said means being progressively decreased by predetermined increments of speed as said element changes toward its extreme condition, and automatic means including trackway elements responsive to the presence of a train on the track for causing said element to change progressively toward its extreme condition at successive points along the track where said trackway elements are located.

38. In an automatic train control system, the combination with a vehicle, of a warning signal on the vehicle adapted to give an arrestive indication to the operator thereof, a normally energized electrically operable slow-acting device having a tendency to assume automatically an ultimate condition after an interval of time, a brake-setting appliance for the vehicle actuated by said slow-acting device after it has attained its ultimate condition, and means responsive to the speed of the vehicle and including a normally closed circuit for simultaneously causing operation of said warning signal and said slow-acting device at control points along the track under dangerous traffic conditions.

39. In an automatic train control system, the combination with automatic train control apparatus for a railway vehicle including a warning signal, a slow-acting device, a brake-setting appliance actuated by said slow-acting device when it has attained its ultimate condition; of means comprising elements partly on the vehicle and partly at control points along the track for causing simultaneous operation of said warning signal and said slow-acting device, said means being effective when the vehicle exceeds predetermined limiting speeds in passing said control points, the trackway elements of said means being responsive to the presence of another train ahead.

40. In an automatic train control system, the combination with automatic train control apparatus for railway vehicles including a warning signal, a time controlled device, and a brake-setting appliance operated by said time-controlled device after the lapse of a predetermined time; of impulse transmitting means comprising elements partly on the vehicle and partly along the track for causing simultaneous operation of said warning signal and said time controlled device; and means responsive to the presence of another train ahead for determining the controlling condition of the trackway elements of said impulse transmitting means in accordance with traffic conditions ahead.

41. In an automatic train control system, the combination with a vehicle, of an electrically controlled warning signal, an electrically governed time controlled device, a brake-setting appliance actuated by said time controlled device after the lapse of a predetermined interval of time, a normally closed circuit for simultaneously energizing said warning signal and said time controlled device, and traffic controlled means partly on the vehicle and partly along the track for controlling said circuit.

42. In an automatic train control system, the combination with a vehicle and a track therefor, of several sources of signaling current on the track varying distinctively in their electrical characteristics and adapted to be combined, means partly on the track and partly on the vehicle and influenced by the presence of other trains ahead for supplying to the vehicle at substantially all points in its travel variable combinations of said signaling currents dependent upon the number of intervals of distance between said vehicle and the next train ahead, and automatic train control apparatus on said vehicle selectively responsive to the varying combinations of said signaling currents for imposing different fixed speed limit for each of said current combinations.

43. In an automatic train control system, the combination with a vehicle, of a circuit thereon, control means in said circuit responsive to the variations in the electrical characteristics of the current flowing in said circuit, automatic train control apparatus on the vehicle including a permissive speed device governed by said control means and adapted to enforce a different fixed limitation on the speed of the vehicle for each variation of current in said circuit, and means along the trackway responsive to the presence of a train on the track for supplying such varying currents to the circuit on a passing vehicle at substantially all points in the travel of the vehicle.

44. In an automatic train control system, the combination with a vehicle, of automatic train control apparatus thereon including a circuit, electro-responsive means included in said circuit, said apparatus being adapted to enforce different speed restrictions for the vehicle in accordance with variations in the electrical characteristics of the current flowing in said circuit, sources of current along the track of different electrical characteristics and adapted to be combined, impulse means along the track divided into sections, impulse receiving means on the vehicle, each section of said impulse means along the track when energized from said sources of current being adapted to cooperate with said receiving means on the vehicle and produce current flowing in said circuit corresponding to the currents applied to that section, and means responsive to the presence of a train on the track for connecting said sources of current to a plurality of said sections in the rear of that train in progressively varied combinations, whereby the speed of the following vehicle is automatically reduced step by step as it approaches a train ahead.

45. In an automatic train control system, the combination with a vehicle, of automatic train control apparatus therefor adapted to be influenced to automatically enforce three or more continuing speed limitations for the vehicle varying from a maximum to a minimum, and means including normally closed track circuits and stationary trackway impulse transmitting devices controlled thereby for influencing said train control apparatus and causing it to impose successively lower speed limitations at intervals along the track as the vehicle approaches an occupied track circuit.

46. In an automatic train control system, the combination with a vehicle, of automatic train control apparatus therefor adapted to be influenced to automatically enforce three or more continuing speed limitations for the vehicle varying from a maximum to a minimum, said apparatus also including a warning signal operated prior to the application of the brakes, and means including normally closed track circuits and stationary trackway impulse transmitting devices controlled thereby for influencing said train control apparatus and causing it to impose successively lower speed limits at intervals along the track as the vehicle approaches an occupied track circuit.

47. In an automatic train control system, the combination with a railroad track, of a plurality of stationary impulse devices disposed along the track at intervals in the braking distance for vehicles traveling over the track, means responsive to the presence of a train on the track for governing the controlling condition of said impulse devices, and automatic train control apparatus on a following vehicle influenced by said impulse devices under dangerous traffic conditions to impose successively lower limitations upon the speed of the vehicle at said intervals along the track as the vehicle passes said impulse devices.

48. In an automatic train control system, the combination with a railroad track, of a plurality of stationary impulse devices disposed along the track at intervals in the braking distance for vehicles traveling on the track, means responsive to the presence of a train on the track for governing the controlling condition of said impulse devices in accordance with traffic conditions ahead, and automatic train control apparatus on a following vehicle adapted to enforce automatically successively lower speed limitations for a vehicle under the influence of said impulse devices as the vehicle passes them, said train control apparatus having a tendency to assume its lowest speed condition.

49. In an automatic train control system, the combination with a vehicle and a track therefor provided with normally closed track circuits, of a permissive speed device on the vehicle changeable step by step to establish different continuing permissive speeds for the vehicle, a speed responsive device on the vehicle governed by the actual speed thereof, a warning signal and a brake-setting appliance on the vehicle governed jointly by said permissive speed device and said speed responsive device and operated successively with an intervening interval of delay when the actual speed exceeds the prescribed permissive speed, and means partly on the vehicle and partly along the track and governed by said track circuits for causing said permissive speed device to change and establish successively lower permissive speeds as the vehicle travels through a region of limited extent behind a track circuit occupied by a train ahead, whereby lower speed limitations are automatically imposed upon said vehicle as it approaches a train ahead and the warning signal will be first operated and then after an interval, the brakes will be automatically applied, if the speed of the following vehicle exceeds the speed limitations prescribed.

50. In combination, a railway vehicle, electrically-operated vehicle controlling means thereon, a circuit for controlling said vehicle controlling means and cooperating circuit controllers for said circuit, means controlled by the speed of the vehicle connected to one of said circuit controllers, and means connected to the other of said circuit controllers for determining the speed at which the vehicle may run.

51. In combination, a vehicle, electrically-operated vehicle controlling means thereon, a circuit for controlling said vehicle controlling means, circuit controllers in said circuit, a speed governor on said vehicle for operating one of said circuit controllers, and a device on said vehicle for determining the speed at which the vehicle may run, for operating the other of said circuit controllers.

52. Automatic train control equipment for railway vehicles comprising a normally energized brake control device, a plurality of circuits corresponding to different permissive speeds for the vehicle and each effective to maintain said brake control device energized, speed-responsive means governed by the actual speed of the vehicle for opening such of said circuits as correspond to speeds lower than the existing actual speed, and normally energized electro-responsive permissive speed means adapted to open and close said circuits selectively, said permissive speed means being biased toward its lowest speed condition and acting automatically to open all of said circuits when deenergized.

53. In an automatic train control system for railway vehicles, speed control apparatus on a vehicle comprising a normally energized brake setting device, a normally closed energizing circuit for said device having a plurality of branches in multiple, speed-responsive means for selectively controlling said multiple branches in accordance with the actual speed of the vehicle, electro-responsive permissive speed means for selectively controlling said multiple branches in accordance with the safe permissible speed for the vehicle, said permissive speed means being biased to open all of said branches when deenergized, and means responsive to the presence of trains on the track for distinctively energizing said permissive speed means to conform with the number of predetermined intervals of distance between the vehicle and a train ahead.

54. In a system for protecting traffic on railroad tracks divided into blocks, the combination with speed control apparatus on a vehicle selectively responsive to electrical energy of different characteristics and adapted to enforce corresponding limitations on the speed of the vehicle, of means partly on the vehicle and partly along the track normally supplying electrical energy to the vehicle at substantially all points in its progress through each block for controlling said apparatus, said means acting automatically to vary the electrical characteristics of such energy supplied to the vehicle in a block to conform to the extent of unoccupied track in advance of the vehicle.

55. In an automatic train control system for railroads having tracks divided into track sections each provided with a normally closed track circuit, speed control apparatus on a vehicle adapted to restrict the speed thereof to any one of a plurality of speeds, said apparatus having a tendency to assume its lowest speed condition, and means controlled by said track circuits and normally acting in opposition to said tendency for causing said apparatus to enforce any one of three or more different speed restrictions conforming with the number of track sections between said vehicle and the next vehicle ahead.

56. In an automatic train control system for railroads, the combination with automatic speed control apparatus on a vehicle including means permitting the vehicle to proceed at a maximum speed, other means permitting the vehicle to proceed at a restricted speed, and control means responsive to electrical energy of different characteristics for rendering one or the other of said means effective, of impulse transmitting means for normally supplying such electrical energy to the control means on a vehicle at substantially all points in its travel of a characteristic dependent upon the proximity of the next train ahead.

57. An automatic train control system for railroads having tracks divided into blocks, comprising traffic controlled influence communicating means partly on the track and partly on a vehicle for producing on said vehicle during its progress through each block a clearance current of one character for maximum speed or another current of a distinctive character for a limited speed, and train control apparatus on the vehicle biased to a condition to retard the vehicle, said apparatus being normally influenced at substantially all points in the travel of the vehicle by said currents in opposition to its bias to assume a condition enforcing speed limitations corresponding to the character of current supplied thereto.

58. In an automatic train control system, the combination with automatic speed control apparatus on a vehicle comprising a normally energized brake control device, a plurality of circuits each adapted to maintain said device energized, speed responsive means connected to the wheels of the vehicle for opening and closing said circuits in correspondence with the actual speed of the vehicle, electro-responsive means including a movable element and contacts controlled thereby which are included in said circuits, a contact shoe on the vehicle, a partial circuit including said electro-responsive means and terminating at said contact shoe and the wheels of the vehicle, and traffic controlled means along the track including contact rails for energizing said electro-responsive means to a variable degree.

59. In an automatic train control system, a railroad track divided into track sections each provided with a normally closed track circuit and track relay, a contact rail associated with each track section, and a plurality of partial circuits for each contact rail including sources of current of different voltage, said partial circuits for each contact rail being controlled by the track relays of the corresponding track section and a plurality of track sections in advance thereof to supply progressively decreased voltages to that contact rail depending upon the number of unoccupied track sections in advance thereof.

60. In an automatic train control system, a railroad track divided into track sections each provided with a normally closed track circuit and a track relay, an impulse device associated with each track section, a series of partial circuits for controlling each impulse device governed by a plurality of the track relays belonging to the corresponding track section and a number of track sections in advance thereof, one partial circuit of each series including the front contacts of said plurality of track relays, each of the other partial circuits of each series including a back contact of a given track relay of said plurality and front contacts of the track relays of said plurality in the rear thereof, and sources of current of different electrical characteristics included in said partial circuits.

61. In a speed control system for railway vehicles, in combination, a trackway divided into sections each provided with a track relay, signal rails associated with said track sections, means controlled by said track relays for impressing current of a uniform voltage upon said signal rails when the trackway is free of vehicles and for impressing different voltages upon a plurality of the signal rails in the rear of a train varying in proportion to their distance from such train.

62. In a speed control system for railway vehicles, a track divided into track sections, a signal rail associated with each track section, means responsive to the presence of a vehicle in any track section for energizing a number of the signal rails in the rear thereof with energy of different voltages, the voltage applied to a given signal rail being proportional to its distance from said vehicle ahead, and a permissive speed device on a following vehicle adapted to be set to a permissive speed position corresponding to the voltage of the signal rail of the track section said following vehicle is then occupying.

63. In a speed control system for railway vehicles, a trackway divided into track sections, a signal rail associated with each track section, means responsive to the presence of a vehicle in any track section for producing different electrical conditions in a plurality of the signal rails in the rear thereof, and a permissive speed device on a following train adapted to be set to a permissive speed position corresponding to the electrical condition of the signal rail of the track section that train is occupying.

64. In an automatic speed control system for railroads, signal rails along the track, means for supplying electrical energy of different controlling characteristics to a signal rail corresponding to the speed limitation desired to impose on vehicles at that signal rail, a circuit on a vehicle receiving said electrical energy from said signal rails, a permissive speed device on the vehicle governed by said circuit and having a movable element adapted to be set to different positions corresponding to the character of electrical energy in said circuit, and means including a speed responsive device connected to the wheels of the vehicle for applying the brakes of the vehicle when its actual speed exceeds that prescribed by the existing position of said movable element.

65. In a speed control system for railway vehicles, a track, a vehicle thereon, a permissible speed device on the vehicle having a maximum speed position and a minimum speed position and means including continuous devices along the trackway for normally holding said permissible speed device in its maximum speed position.

66. In a speed control system for railway vehicles, a track, a vehicle thereon, an actual speed device on the vehicle, a permissible speed device on the vehicle having a maximum speed position and a minimum speed position, means including continuous devices along the trackway for normally holding said permissible speed device in its maximum speed position, means for retarding the vehicle and means for actuating the retarding means when the actual speed of the vehicle exceeds a predetermined maximum speed.

67. In a speed control system for railway vehicles, a track, a vehicle thereon, a permissible speed device on the vehicle having a maximum speed position and a minimum speed position, means for normally holding the said permissible speed device in its maximum speed position, means for moving the said permissible speed device from its maximum speed position toward its minimum speed position, and means including continuous devices along the trackway for restoring the said permissible speed device to its maximum speed position.

68. In a speed control system for railway vehicles, a track, a vehicle thereon, an actual speed device on the vehicle, a permissible speed device on the vehicle having a maximum speed position and a minimum speed position, means for normally holding the said permissible speed device in its maximum speed position, means for moving the said permissible speed device from its maximum speed position toward its minimum speed position, means including continuous devices along the trackway for restoring the said permissible speed device to its maximum speed position, means for retarding the vehicle, and means for actuating the retarding means when the actual speed of the vehicle exceeds the permissible speed corresponding to the position of the permissible speed device.

69. A safety apparatus for the automatic control of the speed of vehicles moving along a trackway, comprising a permissible speed device on the vehicle movable between a permissible maximum speed position under safety conditions, and a permissible minimum speed position under danger conditions, means for automatically moving the permissible speed device from a maximum to and positively electrically maintaining it at any one of a plurality of submaximum positions or to a minimum position step by step or reversing such movement corresponding to the position of a temporary hazard moving along the same trackway with respect to the vehicle carrying the device.

70. The combination with a railway divided into blocks, each equipped with roadway control mechanism electrically operated, of a safety apparatus carried by a vehicle traveling along the railway, for the automatic control of the speed of such vehicle, including a permissible speed device and means for moving such device to and positively electrically maintaining it at any one of a series of rate indicating positions varying with the proximity of a temporary hazard to the moving vehicle.

71. The combination with a railway divided into blocks, each equipped with roadway control mechanism electrically operated, of a safety apparatus carried by a vehicle traveling along the railway, for the automatic control of the speed of such vehicle, including a permissible speed device and means for moving such device through electrical impulses received through the roadway mechanism to any one of a series of rate indicating positions varying with the proximity of a temporary hazard moving past the rails and depending upon the distance measured in blocks of such hazard from the vehicle.

72. The combination with a railway divided into blocks, each equipped with roadway control mechanism electrically operated, of a safety apparatus carried by a vehicle traveling along the railway for the automatic control of the speed of such vehicle, including a permissible speed device actuated through electrical impulses received through the roadway mechanism, and varying by steps corresponding to the distance measured in blocks of a temporary hazard from such moving vehicle.

73. An apparatus for the control of vehicles moving along a trackway, comprising a device on the vehicle movable to different positions to establish a variable permissible speed for the vehicle, means adapted to retard the vehicle whenever such established speed is exceeded, in combination with means along the trackway and electrically controlled devices actuated therefrom whereby the permissible speed establishing device is automatically moved to a predetermined safe speed position by the mere presence of a temporary hazard along the trackway at a predetermined distance from the vehicle.

74. An apparatus for the control of vehicles moving along a trackway comprising a device on the vehicle movable to different positions to establish a variable permissible speed for the vehicle, means adapted to retard the vehicle whenever such established speed is exceeded, in combination with means along the trackway and electrically controlled devices actuated therefrom whereby the permissible speed establishing device is automatically moved to a predetermined safe speed position by the mere presence of a temporary hazard along the trackway at a predetermined distance from the vehicle and automatically moved to a different safe speed establishing position by such presence whenever the distance of the hazard from the vehicle is varied by a definite increment.

75. An apparatus for the control of vehicles moving along a trackway, comprising a device on the vehicle movable to different positions to establish a variable permissible speed for the vehicle, means adapted to retard the vehicle whenever such established speed is exceeded, in combination with means along the trackway and electrically controlled devices on the vehicle actuated therefrom whereby the permissible speed establishing device is automatically moved to a predetermined safe speed establishing position by the mere presence of a temporary hazard along the trackway at a predetermined distance from the vehicle and automatically moved to a different safe speed establishing position by such presence whenever the distance of the hazard from the vehicle is varied by a definite increment, in combination with automatic means for restoring the permissible speed establishing devices on the vehicle to normal position when the temporary hazard is moved a predetermined distance from the vehicle or vanishes.

76. In apparatus of the character set forth, the combination with a vehicle, of a permissive speed device movable to and maintainable at different speed positions, and means controlled by the presence of a hazard in advance of the vehicle for moving the permissive speed device to and positively electrically maintaining it at any of the different speed positions according to the proximity of the hazard to the vehicle.

77. In apparatus of the character set forth, the combination with a vehicle, of a permissive speed device having a normal clear or safety position and movable therefrom to and maintainable at a plurality of successively lower speed positions, and means controlled by the presence of a hazard in advance of the vehicle for moving the permissive speed device to and positively electrically maintaining it at any of the lower speed positions according to the proximity of the hazard to said vehicle.

78. In apparatus of the character set forth, the combination with a trackway for vehicles, of a vehicle that traverses the same, a permissive speed device having a normal clear or safety position and movable therefrom to and maintainable at a plurality of successively lower speed positions, and mechanism dependent on the appearance of a temporary hazard on the trackway and its position with relation to the vehicle to move the permissive speed device to and positively electrically maintain it at a predetermined lower speed position.

79. In apparatus of the character set forth, the combination with a trackway for vehicles, of a vehicle that traverses the same, a permissive speed device having a normal clear or safety position and movable therefrom to and maintainable at a plurality of successively lower speed positions, and mechanism dependent on the appearance of a temporary hazard on the trackway and its position with relation to the vehicle to move the permissive speed device to and maintain it at a predetermined lower speed position and to successively change said permissive speed device to and positively electrically maintain it at other speed positions as the vehicle and hazard relatively approach each other.

80. In apparatus of the character set forth, in combination with a trackway for vehicles, of a vehicle that traverses the same, a permissive speed device having a normal clear or safety position and movable therefrom to and positively electrically maintainable at a plurality of successively lower speed positions, and mechanism dependent upon the appearance of a temporary hazard on the trackway to intermittently move the permissive speed device to different speed positions as the vehicle and hazard relatively approach each other.

81. In apparatus of the character set forth, the combination with a trackway divided into sections, of a vehicle adapted to pass along the trackway, a permissive speed device movable to different speed positions, and track-side mechanism automatically controlled by the relative approach of a hazard and the vehicle through successive track sections to cause the permissive speed device to change to a different position upon the change of the number of track sections between the vehicle and hazard and maintain said permissive speed device in substantially a predetermined position while the vehicle is in one section.

82. In apparatus of the character set forth, the combination with a trackway divided into sections, of a vehicle adapted to pass along the trackway, a permissive speed device movable to different speed positions, and trackside mechanism automatically controlled by the appearance of a hazard in a section in advance of the vehicle to cause said permissive speed device to change successively to different predetermined positions as the vehicle successively passes into different track sections and more closely approaches the hazard, while maintaining the permissive speed device in substantially said respective predetermined positions while in said track sections.

83. In apparatus of the character set forth, the combination with a trackway divided into sections, of a vehicle adapted to pass along the trackway, a permissive speed device movable to different speed positions, and trackside mechanism automatically controlled by the appearance of a hazard in a section in advance of the vehicle to cause said permissive speed device to change successively to different predetermined lower speed positions as the vehicle successively passes into different track sections and more closely approaches the hazard while maintaining the permissive speed device in a substantially fixed position while in a section, said means returning the permissive speed device reversely to different higher speed positions upon the relative separation of the hazard and vehicle by an increasing number of sections.

84. In apparatus of the character set forth, the combination with a vehicle, of means for indicating danger and also a plurality of safe rates of speed for said vehicle under different conditions, and means dependent upon the appearance of a temporary hazard in advance of the vehicle for automatically causing the said means to indicate danger or any of the said safe rates of speed according to the distance between the hazard and the vehicle, maintaining the proper indication while a predetermined distance remains substantially the same, and changed to another indication when a different predetermined distance obtains.

85. In apparatus of the character set forth, the combination with a vehicle, of means for indicating a maximum safety rate of speed, a danger condition and a plurality of intermediate sub-maximum speeds, and means for causing said indicating means to normally indicate the maximum safety rate of speed including controlling mechanism dependent upon the appearance of a temporary hazard in advance of the vehicle for automatically causing the said means to indicate a danger or any of the intermediate rates of speed according to the distance between the vehicle and the hazard.

86. In apparatus of the character set forth, the combination with a vehicle, of means for establishing a maximum safe speed under clear conditions, a minimum safe speed under danger conditions, and a plurality of safe speeds between the two, and means dependent on the appearance of a hazard and the distance between the same and the vehicle for effecting the operation of said means to establish and temporarily positively electrically maintain one of said predetermined safe speeds for the vehicle.

87. In apparatus of the character set forth, the combination with a vehicle, of means for establishing a maximum safe speed under clear conditions, a minimum safe speed under danger conditions, and a plurality of safe speeds between the two, and means dependent on the appearance of a hazard and the distance between the same and the vehicle for effecting the operation of said means to establish and temporarily positively electrically maintain one of said predetermined safe speeds for the vehicle, and to alter said established speed to another speed when a predetermined change takes place in the distance between the vehicle and hazard.

88. A safety apparatus for the automatic control of the speed of a vehicle moving along a trackway divided into blocks comprising a highway control including a plurality of series of control devices each adapted to be employed in the indication of a permissible speed for the vehicle corresponding to the presence of a temporary hazard in a block a distance from the vehicle predetermined with respect to the actuation of each series of control devices.

89. A safety apparatus for the automatic control of the speed of a vehicle moving along a trackway divided into blocks comprising a highway control including a plurality of series of control devices each adapted to be employed in the indication of a permissible speed for the vehicle corresponding to the presence of a temporary hazard in a block a distance from the vehicle predetermined with respect to the actuation of each series of control devices, and which distance is different for each series.

90. In an automatic train control system for protecting traffic on railroads, a vehicle and automatic brake control apparatus thereon operable under different controlling influences to establish any one of a plurality of different speed limits in accordance with the influence then being communicated to the vehicle, said apparatus automatically applying the brakes of the vehicle if its running speed at any time exceeds the speed limit when in effect, influence receiving means on the vehicle, an alternating current transmission line along the track, and means along the track energized from said transmission line and responsive to the presence of trains for co-operating with said vehicle carried influence receiving means to communicate to the vehicle at substantially all points in its travel some one of said controlling influences dependent upon the extent of unoccupied track in advance of the vehicle.

91. In an automatic train control system for railroads, an alternating current transmission line along the track, means along the track energized from said line for supplying alternating current at intervals along the track to partial circuits including a track rail, said means being responsive to the presence of trains on the track to vary the controlling characteristics of the current in each partial circuit dependent upon the proximity of a train ahead, influence receiving means on the vehicle continuously responsive to the controlling characteristics of the current supplied to the partial circuit at the point where the vehicle is then located, and brake control apparatus on the vehicle responsive to said controlling characteristics to establish any one of a plurality of different speed limits which the vehicle cannot exceed without an automatic application of its brakes.

92. In a train control system for railroads, the combination with a vehicle, automatic brake control apparatus on the vehicle including a speed responsive device driven from the wheels thereof, said apparatus being changeable to establish a maximum speed limit and a plurality of lower fixed speed limits which the vehicle cannot exceed without an automatic application of its brakes, means along the track providing a series of partial circuits each extending for a limited distance along the track, track circuit controlled means for energizing said partial circuits with alternating current of different controlling characteristics dependent upon the extent of unoccupied track ahead, and impulse receiving means on the vehicle continuously responsive to the energization of said partial circuits for governing said brake control apparatus.

WINTHROP K. HOWE.